United States Patent
Mastice et al.

(10) Patent No.: US 8,474,544 B2
(45) Date of Patent: Jul. 2, 2013

(54) HORSESHOE TRACTION DEVICE WITH DISPOSABLE INSERT AND REUSABLE STUD AND RELATED METHOD

(76) Inventors: Michael M. Mastice, Parsippany, NJ (US); Lawrence P. Getto, Reddick, FL (US)

( * ) Notice: Subject to any disclaimer, the term of this patent is extended or adjusted under 35 U.S.C. 154(b) by 640 days.

(21) Appl. No.: 12/228,309

(22) Filed: Aug. 12, 2008

(65) Prior Publication Data
US 2009/0044959 A1    Feb. 19, 2009

Related U.S. Application Data

(60) Provisional application No. 60/965,290, filed on Aug. 17, 2007.

(51) Int. Cl.
*A01L 7/04* (2006.01)
(52) U.S. Cl.
USPC .................................. 168/29; 168/31; 168/41
(58) Field of Classification Search
USPC .......................................... 168/29, 31, 39, 41
See application file for complete search history.

(56) References Cited

U.S. PATENT DOCUMENTS

| | | | | | |
|---|---|---|---|---|---|
| 335,259 | A | * | 2/1886 | Warren | 168/29 |
| 800,680 | A | * | 10/1905 | Roberts | 168/39 |
| 1,155,231 | A | * | 9/1915 | Greenlee | 168/29 |
| 1,159,488 | A | * | 11/1915 | Gallup | 168/41 |
| 1,222,708 | A | * | 4/1917 | Wunder | 168/41 |
| 2008/0115946 | A1 | * | 5/2008 | Baruffolo | 168/42 |

FOREIGN PATENT DOCUMENTS

| | | |
|---|---|---|
| DE | 102004026191 A1 * | 1/2005 |
| WO | WO 2005082193 A1 * | 9/2005 |

* cited by examiner

*Primary Examiner* — Son T Nguyen
(74) *Attorney, Agent, or Firm* — Bernard Malina

(57) ABSTRACT

A device and method for enhancing traction effectiveness of horseshoes is provided. The device includes a non-threaded stud and a non-threaded insert for receiving the stud. The insert has expandable wall sections with inwardly projecting protrusions, the wall sections at least partially sheathing the stud. The stud and insert create an assembly formed-fittingly insertable in an aperture formed on a bottom surface of the horseshoe. The stud projects outward from the bottom surface, is secure against dislodgement when the horseshoe is worn, and yet removable without threadably twisting the stud.

5 Claims, 4 Drawing Sheets

HORSESHOE TRACTION DEVICE WITH DISPOSABLE INSERT AND REUSABLE STUD AND RELATED METHOD

PRIOR APPLICATIONS

This application claims priority from Provisional Patent Application Ser. No. 60/965,290, filed Aug. 17, 2007 entitled "Horseshoe Traction Devices With Disposable Insert and Reusable Stud."

BACKGROUND OF THE INVENTION

1. Field of the Invention

The invention relates to a traction device and method of attaching the traction device to horseshoes.

2. The Related Art

Footwear should be adapted and appropriate for an activity. Dependent upon the activity, humans can easily change their footwear. Among animals, the horse is unique in its ability to wear a replaceable shoe. However, replacement at a moment's notice of the horseshoe to improve traction is not easily achieved. Much like the human, certain activities require improved traction.

The art has reported many devices to improve the horseshoe. For instance, U.S. Patent Application/Publication No. 2007/0209309 A1 (Renzetti) discloses a horseshoe stud with a head and a shaft having a plurality of ribs formed thereon and extending at lest partially circumferentially around the shaft. The ribs are preferably of a frustro-conical shape. Installation is said to be easier than known studs having smooth shafts.

EP 1 614 349 A2 (Sautter, et al.) describes a system for clamping threaded studs onto a horseshoe. A holder with a central slot slides onto an arm of a horseshoe. The stud is then screwed into a threaded bore in the holder.

WO 2005/082193 A1 (Fell) discloses a horseshoe with threaded holes adjacent heels of the shoe. An insert is screwingly engaged into the hole to sit generally flush with a ground engaging surface. The insert defines a central bore which can receive a cylindrical extension that projects from the center of the base of the stud. A magnetic washer encircles the extension to clamp the stud and insert together.

GB 0160,515 A (Addison) reports renewable studs of the kind which are furnished with tapered sockets adapted to be screwed on tapered projections furnished integrally on a horseshoe. The projections and sockets are formed tapering very slightly so as to be secured together frictionally by driving. The projection at the toe part is of rectangular, elliptical or other elongated form with the longest dimension across the shoe, the projections at the heel parts being square or polygonal.

GB 184,985 A (Collins) reports spikes or studs for horseshoes of the kind provided with a screw-threaded shank having a central bore to receive a tool for extraction when broken. These studs are made with a wedge-shaped body having a straight biting edge.

GB 203,095 A (Dowling) discloses resilient non-slip studs detachably fitted in recesses in a horseshoe, the base of the recesses being of concave form to provide an air cushion. Ridges of various shapes are formed round the studs to secure them in the recesses.

GB 2 419 507 A (Jenkins) discloses a plug for use with a horseshoe. When studs are removed from the shoe, threaded holes are left. The plug comprises a threaded cylinder having flat ends, which can be threaded into the holes to protect them. The plug has a slit at one end to allow it to be screwed in and removed using a screwdriver.

DE 202005005955 U1 (Hartmut) discloses a horseshoe having vertical bores at the ends of its arms into which studs can be fitted. These are fixed in place by grub screws inserted into threaded transverse bores.

The breadth of the horseshoe literature underlines the significant need to improve the animal's balance and grip over uneven or slippery terrain. Good traction can render the horse more agile and allow the animal to jump or otherwise move more confidently in poor footing. The traditional means as shown in the aforementioned patent literature allow for improved traction using studs that are temporarily threaded into a bottom of the horseshoe. Invariably, the technology requires there first be drilled into the bottom of the shoe a hole for receiving a stud. More often than not, the studs are screwably retained within a respective hole that is formed with internal threads.

A practice with horses is that studs are installed only when the animal is at work. When returned to the paddock or barn, the studs are normally removed from the horseshoes. Cotton packing or rubber plugs can be used to prevent dirt from corroding the internal threads of a stud hole. Horse enthusiasts (amateur and professionals) routinely find the process difficult. Cleaning requires some degree of skill, experience and strength to successfully re-install each stud.

Accordingly, it is an object of the present invention to provide a device and method for simple and easy installation/removal of studs into the bottom of a horseshoe. Not only must there be ease of operation but devices for this purpose must interlock with the horseshoe to firmly hold the system in place during use.

SUMMARY OF THE INVENTION

A device for enhancing traction effectiveness of horseshoes is provided which includes:
(i) a non-threaded stud;
(ii) a non-threaded insert for receiving the stud having expandable protrusions and at least partially sheathing the stud, wherein a combination of stud and insert form-fittingly are installable in a non-threaded aperture formed on a bottom surface of a horseshoe, the stud projecting outwardly from the bottom surface, being secured against dislodgment when the horseshoe is worn by a horse and yet removable without threadingly twisting the stud.

Also provided is a method for enhancing traction effectiveness of horseshoes. The method involves:
(i) providing a non-threaded stud and a non-threaded insert sized to accept the stud, the insert having expandable protrusions and at least partially sheathing the stud;
(ii) providing a horseshoe with an aperture sized to receive a combination of stud sheathed within the insert; and
(iii) installing the stud and the insert within the aperture, installation resulting in the stud projecting outward from a bottom surface of the horseshoe, being secured against dislodgement when the horseshoe is worn by a horse and yet removable without threadingly twisting the stud from within the aperture.

BRIEF DESCRIPTION OF THE DRAWINGS

Further benefits, features and aspects of the present invention will become more readily apparent from consideration from the following drawings in which.

DETAILED DESCRIPTION OF THE INVENTION

Now there has been found a traction device which utilizes a disposable insert and a reusable stud. Instead of a threaded aperture formed in a horseshoe to receive a stud, the present invention utilizes a smooth bore aperture, best formed with tapered walls. The insert has segmented walls and inwardly arranged protrusions allowing expansions of the wall/protrusion upon insertion of the shaft. No longer is it necessary to first clean out threads of the aperture between refitting of studs. Moreover, smooth aperture walls avoid the necessity of holding a horse's foot for any length of time which requires both strength and skill as well as being a dangerous activity.

Figure 1:
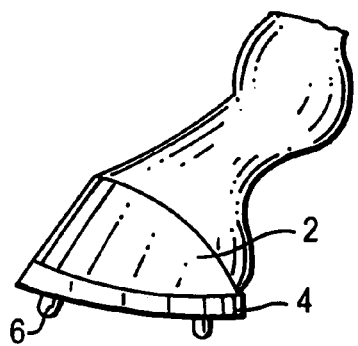
FIG. 1 is a traction device according to the present invention showing studs fitted onto a horseshoe mounted on a foot of the animal.
Figure 2:
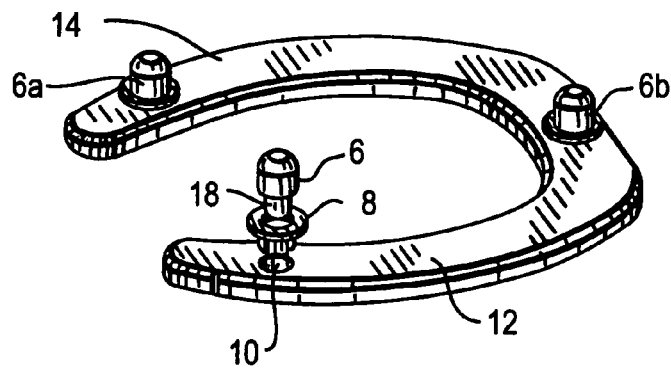
FIG. 2 is a first embodiment of the present invention showing two studs installed and a third stud-insert arranged for installation on a bottom surface of a horseshoe.

FIG. 1 illustrates the hoof 2 of a horse fitted with a horseshoe 4 and exhibiting studs 6. A first embodiment of the present invention is revealed in FIG. 2. Therein, two of three studs 6A, 6B are shown in an installed position. The third stud 6 is shown in an exploded view pre-installation. An insert 8 is implaced within an aperture 10 formed on a lower surface 12 of a horseshoe 14.

Figure 3:
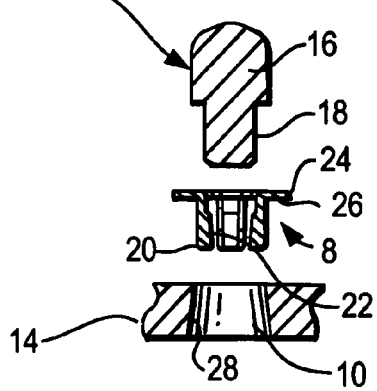
FIG. 3 is a cross-sectional exploded view of a stud/insert according to a first embodiment of the present invention.

A more detailed view of the first embodiment can be seen in FIG. 3. This exploded view reveals a stud 6 with a head 16. Integrally forged (metal) or molded (plastic) with head 16 is a shaft 18, the head having a larger circumference than the shaft. Insert 8 has a body segmented into wall sections 20, each having on an interior surface a protrusion 22. The segmented wall sections are outwardly expandable. One end of the insert body is a flange 24 with an undersurface 26.

Figure 4:
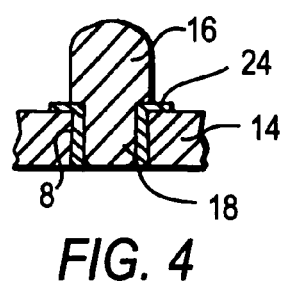
FIG. 4 is a cross-sectional view showing final installation of the first embodiment according to FIG. 3.

FIG. 4 illustrates a fully inserted traction device. Installation occurs by first placing insert 8 within aperture 10. Thereupon, the shaft portion of the stud is forced downward into the insert using a simple striking device. As the shaft penetrates the insert, outward pressure is applied against the protrusions 22 forcing the wall sections 20 outward eventually formed-fitting into the tapered bore 28 of the aperture 10. Angles of taper may range anywhere from 1 to 15, preferably from 2 to 10, and optimally, from 2 to 5 degrees. Installation is complete when the head of the stud abuts flange 24 and the latter rests against lower surface 12 of the horseshoe. Removal of the stud easily occurs by applying an extraction force of leverage or a straight withdraw motion. No twisting or unscrewing is necessary to extract the stud from the horseshoe. Ordinarily, the stud is reusable and insert disposable upon extraction from the horseshoe.

Figure 5:
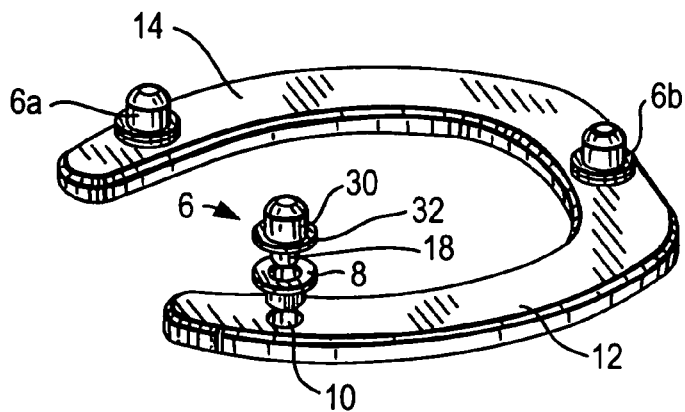
FIG. 5 is a second embodiment of the present invention showing two studs installed and a third stud/insert arranged for installation on a bottom surface of a horseshoe.
Figure 6:
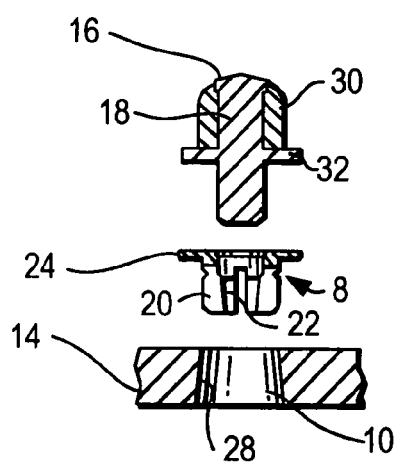
FIG. 6 is a cross-sectional exploded view of a stud/insert according to a second embodiment of the present invention.
Figure 7:
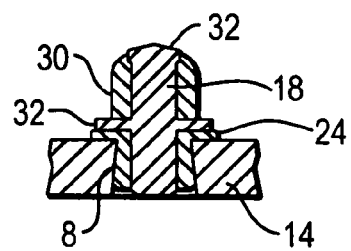
FIG. 7 is a cross-sectional view showing final installation of the second embodiment according to FIG. 3.

FIG. 5 illustrates a second embodiment of the present invention. Wall structure elements identical with the first embodiment have the same numbering system; only elements different from the first embodiment are specifically denoted by new element numbers. The second embodiment is distinguished by structure associated with stud 6. A plastic or rubber jacket 30 surrounds a circumference of the shaft 18. In this embodiment, the head 16 is of a smaller geometry than in the first embodiment. A stud flange 32 surrounds the shaft and projects outwardly therefrom. Stud flange 32 is formed integrally with the stud (e.g., insert molded).

Figure 8:
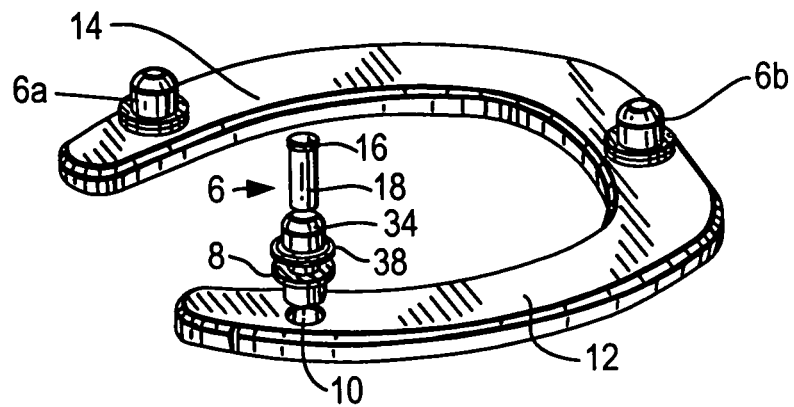
FIG. 8 is a third embodiment of the present invention showing two studs installed and a third stud-insert arranged for installation on a bottom surface of a horseshoe.
Figure 9:
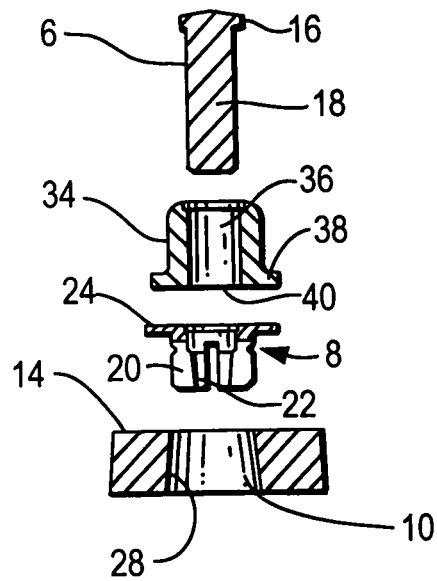
FIG. 9 is a cross-sectional exploded view of a stud/insert according to a third embodiment of the present invention.
Figure 10:
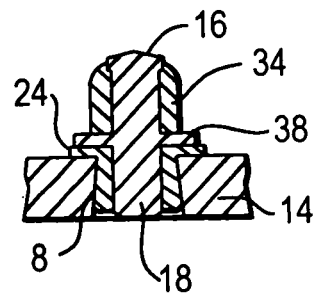
FIG. 10 is a cross-sectional view showing final installation of the third embodiment according to FIG. 3.

FIGS. 8-10 illustrate a third embodiment of the present invention. Numbering of the elements is identical to that used for the first embodiment FIGS. 2-4 except for new features. Fort his embodiment, the traction device includes a further separable part identified as a jacket 34 having a bore 36 formed-fittingly receiving shaft 18 of the stud. A jacket flange 38 is formed circumferentially surrounding an exit mouth 40 of a bore. Except for the separable nature and flange, the jacket of the third embodiment is essentially identical to that of the second embodiment.

Figure 11:
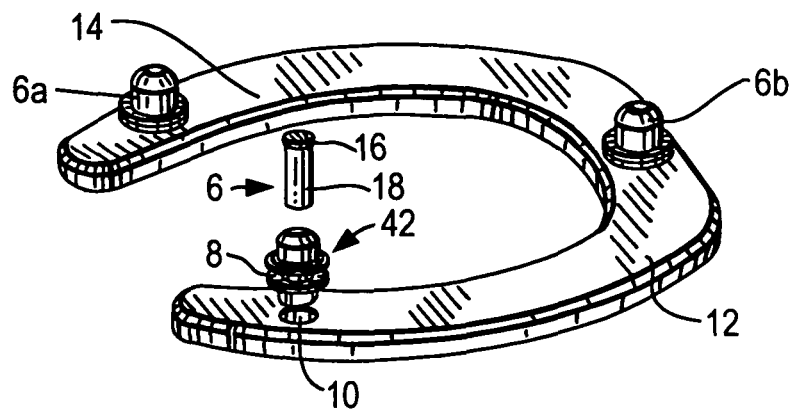
FIG. 11 is a fourth embodiment of the present invention showing two studs installed and a third stud-insert arranged for installation on a bottom surface of a horseshoe.
Figure 12:
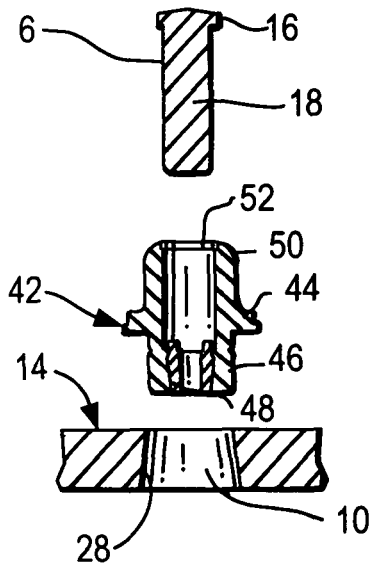
FIG. 12 is a cross-sectional exploded view of a stud/insert according to a fourth embodiment of the present invention.
Figure 13:
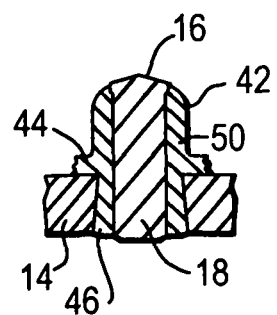
FIG. 13 is a cross-sectional view showing final installation of the fourth embodiment according to FIG. 3.

FIGS. 11-13 illustrate a fourth embodiment of the present invention. This embodiment in particular shares many features of the third embodiment. Notably, the stud includes a head 16 relatively small in comparison to the shaft 18. Insert 42 combines the insert 8 and jacket 34 features found in the third embodiment. More particularly, insert 42 includes a flange 44 wall sections 46 fitted with protrusions 48 projecting inwardly, the wall sections being expandable due to their segmentation. Above flange 44 and unitarily molded to the insert is a sleeve 50 equivalent in motion to the jacket of the second and third embodiments. Assembly of the device begins by installing insert 42 within aperture 10 of the horseshoe. Thereafter, stud 6 is forced through a channel of insert 42. As shaft 16 enters an area of the protrusions 48, wall sections 46 expand outwardly to form-fit the tapered walls of bore 10. Further movement of the stud through the insert is arrested when head 16 meets the narrower mouth 52 of the insert.

What is claimed is:

1. A method for enhancing traction effectiveness of horseshoes comprising:
   (i) providing a non-threaded stud and a non-threaded insert sized to accept the stud, the insert having wall sections fitted with protrusions, said wall sections being expandable due to their segmentation, and said insert at least partially sheathing the stud;
   (ii) providing a horseshoe with an aperture sized to receive a combination of stud sheathed within the insert: and
   (iii) installing the stud and the insert within the aperture, installation resulting in the stud projecting outward from a bottom surface of the horseshoe being secured against dislodgement when the horseshoe is worn by a horse and yet removable without threadingly twisting the stud from within the aperture.

2. The method for enhancing traction effectiveness of horseshoes as claimed in claim 1 wherein in said step (ii) comprises:
    (ii) providing a horseshoe with an aperture sized to receive a combination of stud sheathed within the insert with the aperture having tapered walls.

3. The method for enhancing traction effectiveness of horseshoes as claimed in claim 1 wherein said step (i) comprises: the insert further comprises a flange.

4. The method for enhancing traction effectiveness of horseshoes as claimed in claim 1 wherein said step (i) comprises: the stud further comprises a head.

5. The method for enhancing traction effectiveness of horseshoes as claimed in claim 1 wherein in said step (ii) the aperture further comprises tapered walls with the taper flaring outwardly away from a bottom surface of the horseshoe.

\* \* \* \* \*